Figure 1:
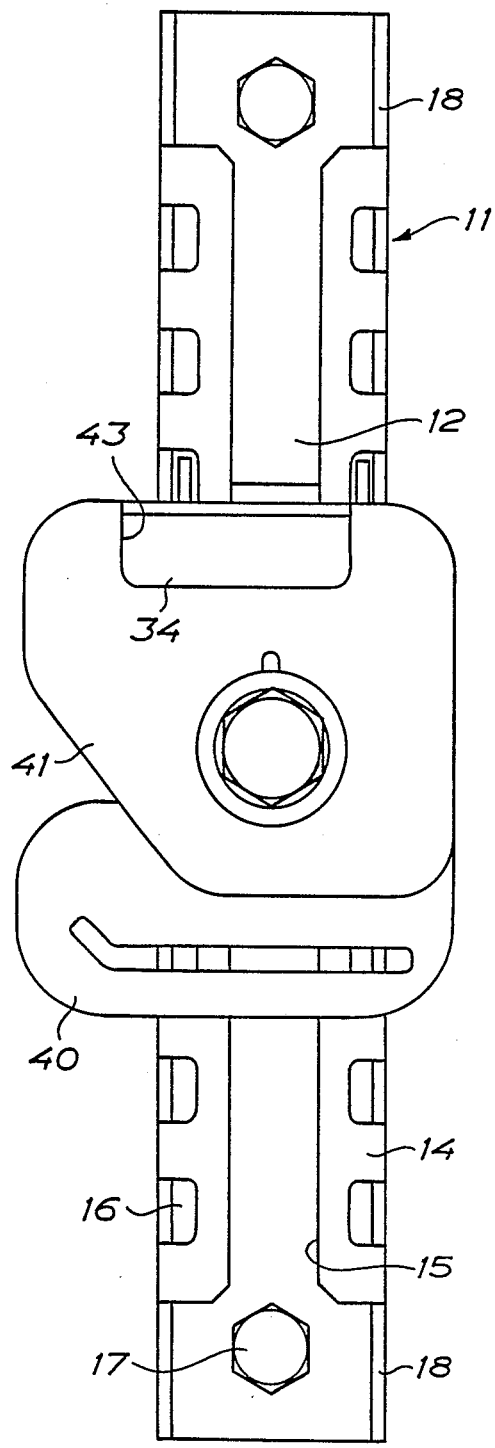

| United States Patent [19] | [11] Patent Number: 4,573,708 |
|---|---|
| Brorsson | [45] Date of Patent: Mar. 4, 1986 |

[54] ARRANGEMENT IN VEHICLE SAFETY BELTS OF THE THREE-POINT TYPE

[75] Inventor: Tommy K. L. Brorsson, Örkelljunga, Sweden

[73] Assignee: Safety Transport Inter Development AB, Anderstrop, Sweden

[21] Appl. No.: 571,469

[22] Filed: Jan. 17, 1984

[30] Foreign Application Priority Data

Jan. 17, 1983 [SE] Sweden .................... 8300192

[51] Int. Cl.$^4$ ............................ B60R 22/00
[52] U.S. Cl. ................... 280/808; 297/483
[58] Field of Search .......... 280/801, 802, 804, 807, 280/808; 297/481, 482, 483, 486

[56] References Cited

U.S. PATENT DOCUMENTS

| 4,135,737 | 1/1979 | Scholz et al. | 280/808 |
| 4,398,751 | 8/1983 | Wahlmann et al. | 280/808 |
| 4,453,741 | 6/1984 | Hipp et al. | 280/801 |
| 4,470,618 | 9/1984 | Ono | 297/483 |

FOREIGN PATENT DOCUMENTS 2303222 8/1974 Fed. Rep. of Germany .

*Primary Examiner*—Joseph F. Peters, Jr.
*Assistant Examiner*—Ross Weaver
*Attorney, Agent, or Firm*—Merchant, Gould, Smith, Edell, Welter & Schmidt

[57] ABSTRACT

An arrangement in vehicle safety belts of the three-point type for adjusting stepwise the height of the anchoring fitting located at shoulder level at one side of the seat. The arrangement comprises a fixedly mounted guide rail having U-shaped cross-sectional form and edge flanges projecting towards each other, which define a longitudinal slot and form a number of recesses distributed along the slot, and a slide which is displaceable along the guide rail and comprises an engagement element and a lock element. The engagement element is displaceable in the transverse direction of the web of the guide rail for releaseable engagement with the recesses in a desired longitudinally displaced position under spring bias with the engagement element spanning the slot between the edge flanges. The anchoring fitting is arranged on the engagement element. The lock element is connected with an operation member available outside the guide rail to be operated manually and is displaceable in relation to the engagement element in the longitudinal direction of the guide rail guided by the guide rail in engagement with the web and edge flanges thereof. The engagement element is guided on the lock element to be disengageable from the recesses against the spring bias by displacement transversally of the web of the guide rail when the lock element is displaced in relation to the engagement element in the longitudinal direction of the guide rail.

8 Claims, 10 Drawing Figures

ARRANGEMENT IN VEHICLE SAFETY BELTS OF THE THREE-POINT TYPE

The invention relates to an arrangement in vehicle safety belts of the three-point type for adjusting stepwise the height of the anchoring fitting located at shoulder level at one side of the seat.

When the term anchoring fitting is mentioned herein it refers not only to a fitting for anchoring the chest strap part of the vehicle safety belt but also to a deflection fitting for passing through the chest strap part of a retractor belt which is now the most common embodiment of vehicle safety belts of the three-point type. Then, the chest strap part passes through the deflection fitting down to a retractor arranged at a lower level.

In order that a vehicle safety belt of the threepoint type shall function in the correct way at sudden braking or at a collision without the user of the vehicle safety belt being injured or slides off the belt, it is important that the strap geometry is the correct one, i.e. that the anchoring locations of the vehicle safety belt are arranged at proper positions in relation to the user. This is true particularly as far as the anchoring fitting arranged at shoulder level at one side of the seat is concerned, the height of the location thereof being dependant of the height of the user. Practically always this anchoring fitting is fixedly arranged in the vehicle, and in that case the position thereof is chosen such that the position is suitable for persons considered to be of normal height, which means that the position is not correct for tall or short persons. Therefore, arrangements of the art referred to above have been proposed, which make possible to adjust the anchoring fitting at shoulder level to the position which is suitable for the person who shall use the vehicle safety belt, in order to obtain the correct strap geometry.

An arrangement already proposed for such height adjustment of the anchoring fitting is disclosed in the German published patent application No. 30 30 209 and comprises a fixedly mounted guide rail having U-shaped cross-sectional form and edge flanges projecting towards each other, which define a longitudinal slot and form a number of recesses distributed along the slot, and a slide supporting the anchoring fitting, which is displaceable along the guide rail and has an engagement element displaceable in the transverse direction of the web of the guide rail for releaseable engagement with the recesses in a desired longitudinally displaced position with the engagement element spanning the slot between the edge flanges, the engagement element being engaged with the recesses under spring bias and being disengageable from the recesses against the spring bias by means of an operation member arranged outside the guide rail to be operated manually.

The arrangement according to the invention comprises a further development and an improvement of this prior art embodiment, and the object of the invention is to provide an arrangement which above all is safer than the prior art arrrangement wherein the engagement between the slide and the guide rail is maintained by means of a spring load only biasing the slide against the edge flanges in engagement with the recesses.

It is also an object of the invention to provide an arrangement which affords a safe securing of the anchoring fitting in the desired position without any risk of the fitting being dislodged when the vehicle safety belt is loaded at sudden braking or at a collision, which is achieved by eliminating every possibility of the fitting being unintentionally disengaged from the guide rail.

A further object of the invention is to provide an arrangement which does not cause noise in the vehicle during driving and which can be easily built into the side pillar of the vehical body and moreover, which is not the least important thing, is convenient to operate so that one really takes the trouble to adjust the height of the anchoring-fitting, if necessary, when the vehicle safety belt is to be used.

In order to achieve said objects the arrangement of the invention is characterized in that the anchoring fitting is arranged on the engagement element and that the slide comprises a lock element connected with the operation member and displaceable in relation to the engagement element in the longitudinal direction of the guide rail, said lock element being guided for longitudinal displacement in the guide rail in engagement with the web and edge flanges thereof, the engagement element being guided on the lock element to be displaced transversally of the web of the guide rail by relative displacement in the longitudinal direction of the guide rail.

Figure 2:
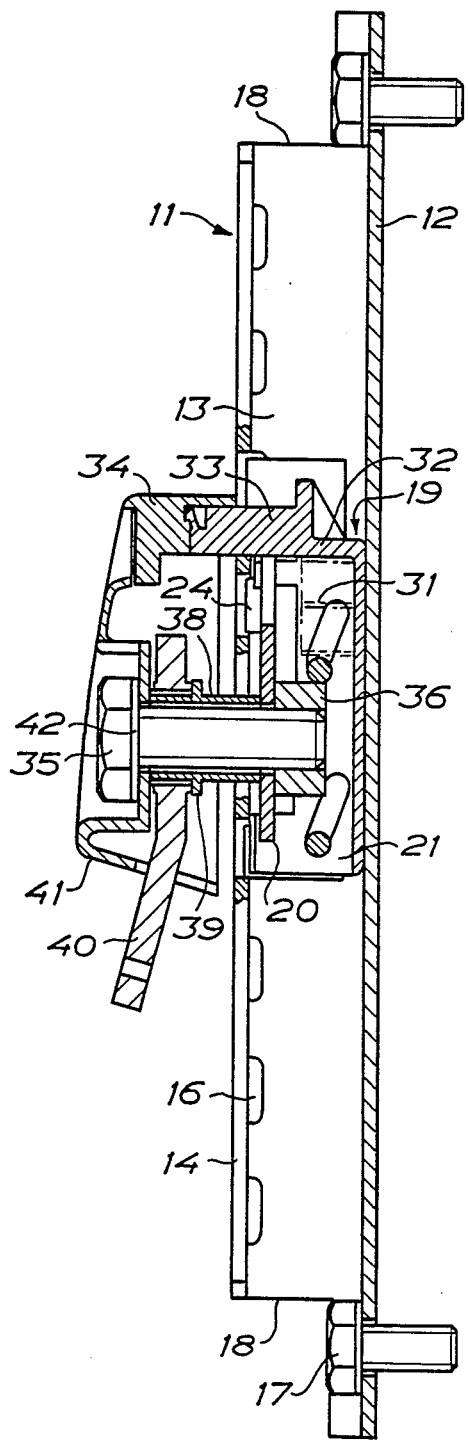
Figure 4:
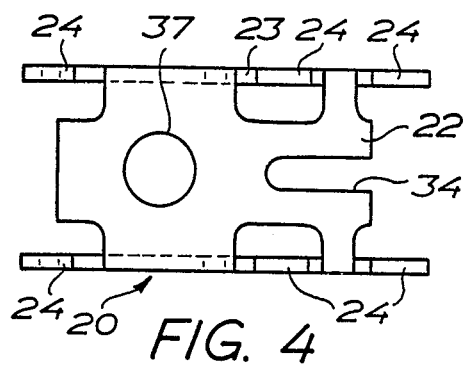
Figure 5:
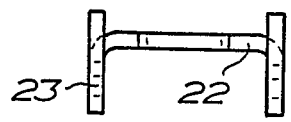
Figure 3:
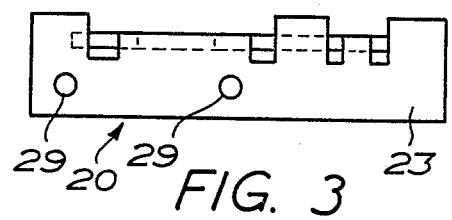
Figure 8:
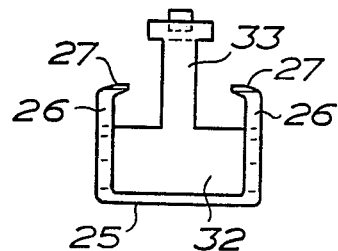
Figure 7:
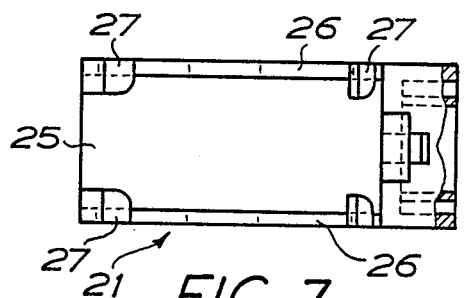
Figure 6:
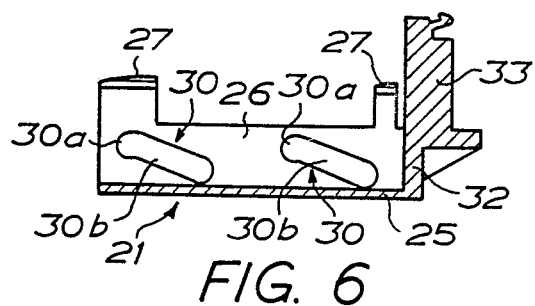
Figure 9:
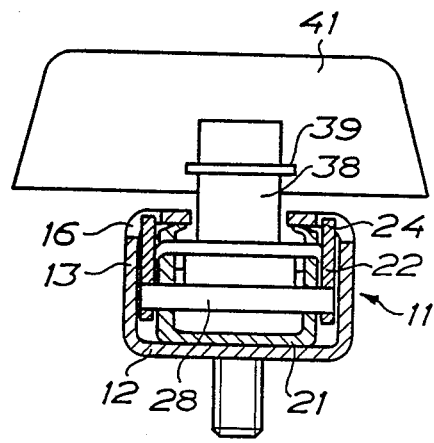
Figure 10:
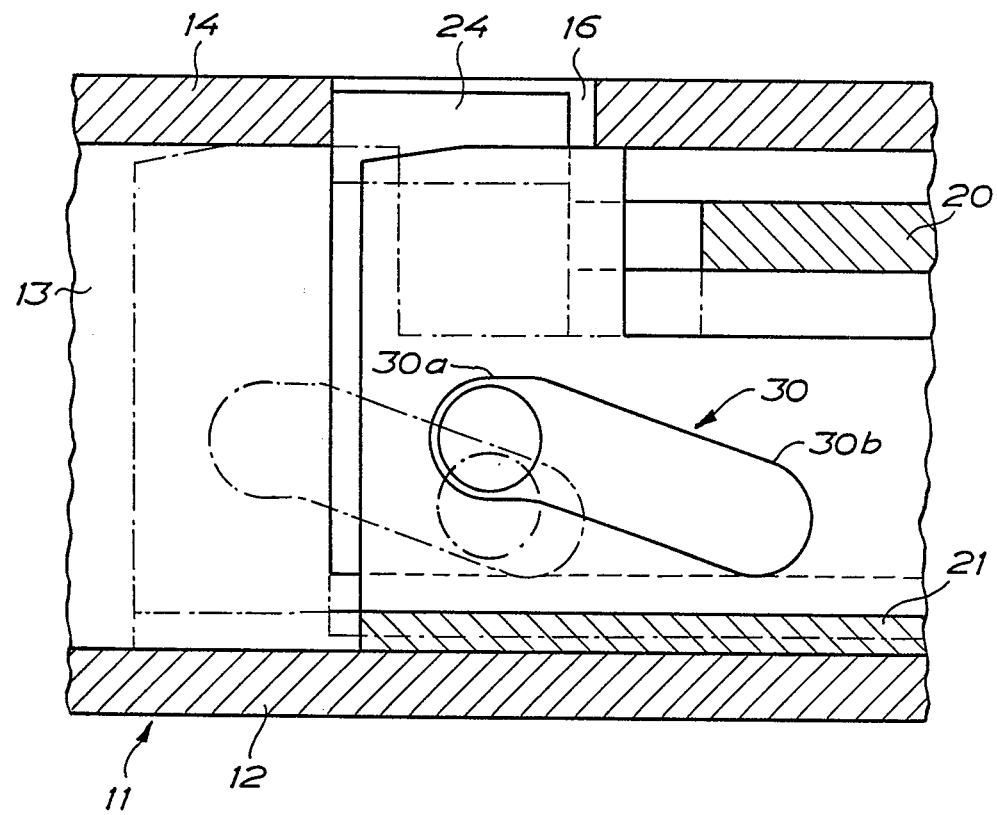

In order to explain the invention in more detail an embodiment thereof will be described below, reference being made to the accompanying drawings in which FIG. 1 is a front view of the arrangement of the invention, FIG. 2 is a central longitudinal cross-sectional view of the arrangement in FIG. 1, FIG. 3 is a side view of an engagement element forming part of the slide, FIG. 4 is a plan view of the engagement element in FIG. 3, FIG. 5 is an end view of the engagement element in FIGS. 3 and 4, FIG. 6 is a vertical cross-sectional view of a lock element forming part of the slide, FIG. 7 is a plan view, partly a cross-sectional view of the lock element in FIG. 6, FIG. 8 is an end view of the lock element in FIGS. 6 and 7, FIG. 9 is a cross-sectional view along line IX—IX in FIG. 2, and FIG. 10 is an enlarged fragmentary longitudinal cross-sectional view of the guide rail and the slide.

Referring to FIGS. 1 and 2 the arrangement comprises a guide rail 11 of U-shaped cross-sectional form and having a web 12, side flanges 13 and edge flanges 14, projecting towards each other, which define a central longitudinal slot 15. Apertures 16 arranged in pairs one opposite to the other are equally spaced along the guide rail in the edge flanges 14 thereof. The guide rail should be mounted at the ends thereof to the body wall of a vehicle by means of bolts 17, the guide rail preferably being flush with the side pillar of the body wall. Recesses 18 are arranged in the side flanges and the edge flanges to make possible insertion and manipulation of the bolts 17.

A slide 19 is mounted for longitudinal displacement in the guide rail 11. Referring also to FIGS. 3-9 this slide comprises two elements, viz. one engagement element 20 shown in FIGS. 3-5 and one lock element 21 shown in FIGS. 6-8. The engagement element 20 should be made of steel sheet and has U-shaped cross-sectional form with a web 22 and side flanges 23. The side flanges form three teeth 24 projecting upwards, which are spaced a distance corresponding to the spacing of the apertures 16. The teeth are dimensioned so as to be passed into the apertures. Preferably, the lock element 21 is made of a plastic material having good anti-friction properties, and also the lock element has U-shaped cross-sectional form with a web 25 and side flanges 26, edge flanges 27 projecting towards each other being arranged on the side flanges. As will be seen from FIGS. 2 and 9 the slide 19 comprising the elements 20 and 21 is arranged in the guide rail 11 with the lock element 21 located inside the engagement element 20. The lock element 21 is displacably guided at the web 25 thereof against the web 12 of the guide rail and at the edge flanges 27 thereof against the edge flanges 14 of the guide rail. Pins 28 interconnect the elements and extend through apertures 29 in the side flanges 23 of the engagement element 20 and through slots 30 in the side flanges 26 of the lock element 21. These slots have a shorter straight portion 30a extending in parallel to the web 25 of the lock element 21, and a longer straight portion 30b including an acute angle with the web 25. A folded leaf spring 31 is engaged between one of the pins 28 and an end wall 32 of the lock element 21 and maintains the two elements displaceable in relation to each other, in the position of FIG. 2 wherein the pins 28 are located in the portion 30a of the slots 30. Accordingly, the engagement element 20 is kept in a position wherein the teeth 24 engage with the apertures 16 and lock the slide against longitudinal displacement in the guide rail.

An arm 33 projects from the lock element 21 and extends through a slot 34 in the web 22 of the engagement element 20. This arm is provided with a push button 34 at the free end thereof projecting through the slot 15 in the guide rail 11. A bolt 35 is screwed into a socket 36 (nut) having inside threads, which is welded to the back side of the web 22 of the engagement element 20. This bolt extends through a circular opening 37 in the web 22 and projects through the slot 15 in the guide rail 11. A socket 38 is passed onto the bolt. Said socket has an annular flange 39, and a deflection fitting 40 is pivotably mounted to the socket; said fitting can be of a conventional construction. Also a protective cap 41 is passed onto the bolt 35, and the socket 38 and the protective cap 41 are clamped by means of the bolt 35, a washer 42 being arranged therebetween and the deflection fitting 40 being positioned between the cap 41 and the annular flange 39. The cap forms a recess 43 in which the push button 34 is located to be easily available.

The teeth 24 of the engagement element 20 are retracted from the apertures 16 in the guide rail 11 by the lock element 21 being displaced longitudinally in relation to the engagement element 20 against the bias of the spring 31. This displacement is effected by the push button being depressed. This is more clearly illustrated in FIG. 10 wherein the engagement-element 20 is shown by solid lines in the engagement position therof and by dot-and-dash lines in a position in which the engagement element is displaced longitudinally in relation to the lock element 21 and thus has been disengaged from the guide rail 11. As a consequence thereof it is possible to longitudinally displace the slide 19 along the guide rail 11, and when the pressure against the push button 34 is relieved, the teeth 24 can again be engaged with the apertures 16 with the slide in a suitable displaced position in relation to the guide rail, the engagement element 20 under the bias of the spring 31 being returned to the position shown by solid lines, and simultanuously being lifted towards the edge flanges 14 of the guide rail by the cooperation of the pins 28 and the slots 30. In the engaged position the pins 28 are received by the portion 30a of the slots 30 so that the teeth 24 can no more be disengaged from the apertures 16 by the engagement element 20 being pressed from the outside towards the bottom of the guide rail. A movement in the longitudinal direction of the guide rail is necessary in order to effect disengagement of the slide and the guide rail. A very great security against unintentional displacement of the slide along the guide rail accordingly is achieved.

It is not necessary that the web of the lock element 21 engages over the entire surface thereof the web 12 of the guide rail 11. A resilient tongue may be arranged in the web 25 of the lock element, which engages at a slide shoe the web 12 of the guide rail 11, the requirements as to the fit between slide and guide rail being reduced as a consequence thereof.

I claim:

1. An arrangement in vehicle safety belts of the three-point type for adjusting stepwise the height of the anchoring fitting located at shoulder level at one side of the seat, comprising a fixedly mounted guide rail having U-shaped cross-sectional form and edge flanges projecting towards each other, which define a longitudinal slot and form a plurality of recesses distributed along the slot, and a slide supporting the anchoring fitting, which is displaceable along the guide rail and has an engagement element displaceable in the transverse direction of the web of the guide rail for releasable engagement with the recesses in a desired longitudinally displaced position with the engagement element spanning the slot between the edge flanges, the engagement element being engaged with the recesses under spring bias and being disengageable from the recesses against the spring bias by means of an operation member arranged outside the guide rail to be operated manually, characterized in that the anchoring fitting is arranged on the engagement element and that the slide comprises a lock element connected with the operation member and displaceable in relation to the engagement element in the longitudinal direction of the guide rail, said lock element being guided for longitudinal displacement in the guide rail in engagement with the web and edge flanges thereof, the engagement element being guided on the lock element to be displaced transversally of the web of the guide rail by relative displacement in the longitudinal direction of the guide rail, said engagement element and the lock element being guided for relative displacement by at least one guide slot in one element and a guide pin engaging said slot on the other element, and said at least one guide slot having a straight portion to receive therein the guide pin under the spring bias with the teeth of the engagement element engaging the apertures in the edge flanges of the guide rail, and another portion angled in relation to said straight portion, for guiding the engagement element towards the web of the guide rail at relative displacement of the engagement element and the lock element against the spring bias.

2. An arrangement as claimed in claim 1, characterized in that the engagement element has a U-shaped cross-sectional form with the web facing the edge flanges of the guide rail, and embraces the lock element.

3. An arrangement as claimed in claim 2, characterized in that two guide pins are arranged between the side flanges of the U-shaped engagement element for cooperation with associated guide slots in the lock element.

4. An arrangement as claimed in claim 1, characterized in that a plurality of pairs of teeth are arranged on the engagement element.

5. An arrangement as claimed in claim 1, characterized in that the lock element is made of a plastic material.

6. An arrangement as claimed in claim 1, characterized in that the lock element has Ushaped cross-sectional form with the web thereof positioned against the web of the guide rail.

7. An arrangement as claimed in claim 6, characterized in that the web of the lock element forms a resilient tongue to be engaged with the web of the guide rail.

8. An arrangement in vehicle safety belts of the three-point type for adjusting stepwise the height of the anchoring fitting located at shoulder level at one side of the seat, comprising a fixedly mounted guide rail having U-shaped cross-sectional form and edge flanges projecting towards each other, which define a longitudinal slot and form a plurality of recesses distributed along the slot, and a slide supporting the anchoring fitting, which is displaceable along the guide rail and has an engagement element displaceable in the transverse direction of the web of the guide rail for releasable engagement with the recesses in a desired longitudinally displaced position with the engagement element spanning the slot between the edge flanges, the engagement element being engaged with the recesses under spring bias and being disengageable from the recesses against the spring bias by means of an operation member arranged outside the guide rail to be operated manually, characterized in that the anchoring fitting is arranged on the engagement element and that the slide comprises a lock element having a U-shaped cross-section with its web positioned against the web of the guide rail connected with the operation member and displaceable in relation to the engagement element in the longitudinal direction of the guide rail, said lock element being guided for longitudinal displacement in the guide rail in engagement with the web and edge flanges thereof, the engagement element being guided on the lock element to be displaced transversally of the web of the guide rail by relative displacement in the longitudinal direction of the guide rail, and said web of said lock element having a resilient tongue to engage the web of the guide rail.

* * * * *